(12) United States Patent
Im

(10) Patent No.: US 10,888,199 B2
(45) Date of Patent: Jan. 12, 2021

(54) UTILITY PAN HANDLE

(71) Applicant: Ok Bin Im, Los Angeles, CA (US)

(72) Inventor: Ok Bin Im, Los Angeles, CA (US)

(*) Notice: Subject to any disclaimer, the term of this patent is extended or adjusted under 35 U.S.C. 154(b) by 33 days.

(21) Appl. No.: 16/259,129

(22) Filed: Jan. 28, 2019

(65) Prior Publication Data
US 2020/0237161 A1  Jul. 30, 2020

(51) Int. Cl.
A47J 45/07 (2006.01)
A47J 37/10 (2006.01)

(52) U.S. Cl.
CPC ........... *A47J 45/071* (2013.01); *A47J 37/108* (2013.01)

(58) Field of Classification Search
CPC ...... A47J 45/071; A47J 45/072; A47J 45/077; A47J 45/078; A47J 45/07; A47J 45/06; A47J 45/062; A47J 45/061; A47J 45/066; A47J 45/067; A47J 45/08; A47J 45/10; A47J 45/00; A47J 37/108; A47J 37/106; A47J 36/025
USPC .............. 220/756, 769, 759; 16/425; 99/345
See application file for complete search history.

(56) References Cited

U.S. PATENT DOCUMENTS

| 2,204,467 A * | 6/1940 | Beatson | A47J 37/10 |
| | | | 126/380.1 |
| 2,647,523 A * | 8/1953 | Vollender, Jr. | A24F 19/0035 |
| | | | 131/257 |
| 3,065,017 A * | 11/1962 | Serio | A47J 45/071 |
| | | | 294/31.1 |
| 3,232,657 A * | 2/1966 | Thompson | A47J 45/071 |
| | | | 294/31.1 |
| 5,704,092 A * | 1/1998 | Nicollet | A47J 45/10 |
| | | | 16/425 |
| 9,629,501 B2 * | 4/2017 | Thielman | A47J 45/061 |
| 2008/0210693 A1 * | 9/2008 | Hoffman | A47J 37/108 |
| | | | 220/573.2 |

FOREIGN PATENT DOCUMENTS

| DE | 202016107466 U1 * | 9/2017 | ............ A47J 37/108 |
| EP | 0766942 A1 * | 4/1997 | .......... A47J 37/1271 |

* cited by examiner

*Primary Examiner* — Allan D Stevens
(74) *Attorney, Agent, or Firm* — John K. Park; Park Law Firm

(57) ABSTRACT utility pan handle is provided, has a base body, a lower jaw, an upper jaw, a handle, a pivot pin, and a bottle. The lower jaw is pressed on an outer brim edge portion of an external container from outside. The upper jaw clips on an inner brim edge portion of the external container from inside. The handle extends vertically from the upper jaw and has an overall L-shape. The pivot pin is installed rotatably through holes disposed though the middle portion of the base body and a connecting portion of the handle and the upper jaw. The bottle engages the second end portion of the base body vertically to the base body and substantially in parallel to the handle. The upper and lower jaws open and close about the pivot pin by closing and opening the handle against the bottle, gripping the brim edge of the external container.

15 Claims, 6 Drawing Sheets

UTILITY PAN HANDLE

BACKGROUND OF THE INVENTION

The present invention relates to a utility pan handle.

A need for a utility pan handle has been present for a long time considering the expansive demands in the everyday life. This invention is directed to solve these problems and satisfy the long-felt need.

SUMMARY OF THE INVENTION

The present invention contrives to solve the disadvantages of the prior art.

An object of the invention is to provide a utility pan handle.

An aspect of the invention provides a utility pan handle, comprising a base body, a lower jaw, an upper jaw, a handle, a pivot pin, and a bottle.

The base body has a first end portion, a middle portion, and a second end portion.

The lower jaw is provided in the first end portion of the base body and configured for being pressed on an outer brim edge portion of an external container from outside thereof.

The upper jaw is configured to clip on an inner brim edge portion of the external container from inside thereof.

The handle extends vertically from the upper jaw and having an overall L-shape, and the handle and the upper jaw are formed integrally.

The pivot pin is installed rotatably through holes disposed though the middle portion of the base body and a connecting portion of the handle and the upper jaw.

The bottle is configured to engage the second end portion of the base body vertically to the base body and substantially in parallel to the handle.

The upper jaw and the lower jaw open and close about the pivot pin by closing and opening the handle with respect to the bottle, gripping the brim edge of the external container.

The lower jaw may comprise two prongs and two receiving grooves. The two prongs are formed with a gap inbetween. Each of the two receiving grooves may be formed on each of the two prongs, and each of the two receiving grooves receives and facilitate to engage stably with the brim edge of the external container.

The base body may further comprise a vertical through-hole provided through the middle portion of the base body, and the handle is disposed through the vertical through-hole of the base body, and the vertical through-hole is configured to allow the handle and the upper jaw rotate about the pivot pin by a specific angle so as to grip or release the brim edge of the external container.

The upper jaw may have a T-shape head and made of metal. The utility pan handle may further comprise a pad portion fixed to a lower surface of the upper jaw and facilitating to grip the inner brim edge of the external container, and the pad portion is made of silicon.

The base body may further comprise a ring porting with a through-opening provided at the second end portion of the base body, and the ring potion is configured to receive and engage with and detachably fix in place the bottle.

The bottle may have a shape of cylinder and is made of heat-resistant plastic, and the through-opening of the ring portion has a diameter substantially same as a diameter of the bottle or a diameter larger than a diameter of the bottle, so that the bottle budges with respect to the base body and still engages the ring portion in place.

The bottle may further comprise a groove or bump and the ring portion comprises a corresponding bump or groove that is configured to be locked with and detachably engage each other.

The bottle may be configured to contain edible oil. The bottle may be configured to is fixed to the second end portion of the base body vertically to the base body and substantially in parallel to the handle.

The external container may comprise a pan with the brim edge with a latching portion protruding outwards. Each of the two receiving grooves may have a cross-sectional shape corresponding to the latching portion.

The utility pan handle may further comprise a plug-bottle installed at a lower open end of and plugging the bottle through male and female fastening devices including threads or O-rings and corresponding groove provided at the bottle and the plug-bottle, wherein the plug-bottle is configured to contain a condiment, and wherein the condiment comprises salt, pepper, or spice.

Another aspect of the invention provides a pan comprising and a container and other component of the above utility pan handle.

The latching portion is provided along a brim edge of the container. The base body has a first end portion, a middle portion, and a second end portion. The lower jaw is provided in the first end portion of the base body and configured for being pressed on the latching portion from outside thereof. The upper jaw configured to clip on the latching portion from inside thereof. The handle extends vertically from the upper jaw and has an overall L-shape, wherein the handle and the upper jaw are formed integrally. The pivot pin is installed rotatably through holes disposed though the middle portion of the base body and a connecting portion of the handle and the upper jaw. The bottle is configured to engage the second end portion of the base body vertically to the base body ad substantially in parallel to the handle. The upper jaw and the lower jaw open and close about the pivot pin by closing and opening the handle with respect to the bottle and gripping the latching portion.

The lower jaw may comprise two prongs and two receiving grooves. The two prongs are formed with a gap inbetween, and each of the two receiving grooves is formed on each of the two prongs, and each of the two receiving grooves receives and facilitate to engage stably with the latching portion.

The base body may further comprise a vertical through-hole provided through the middle portion of the base body, and the handle is disposed through the vertical through-hole of the base body, and the vertical through-hole is configured to allow the handle and the upper jaw rotate about the pivot pin by a specific angle and grip or release the latching portion.

The upper jaw may have a T-shape head and be made of metal.

The base body may further comprise a ring porting with a through-opening provided at the second end portion of the base body, and the ring potion is configured to receive and engage detachably with the bottle.

The bottle may have a shape of cylinder and the through-opening of the ring portion has a diameter substantially same as a diameter of the bottle.

The bottle may be configured to is fixed to the second end portion of the base body vertically to the base body and substantially in parallel to the handle.

The pan may further comprise a plug-bottle installed at a lower open end of and plugging the bottle through male and female fastening devices including threads or O-rings and corresponding groove provided at the bottle and the plug-bottle, wherein the plug-bottle is configured to contain a condiment, and wherein the condiment comprises salt, pepper, or spice.

The advantages of the present invention are: (1) the utility pan handle may be used all kinds of containers; and (2) the utility pan handle according to the invention is detachable and able to hold edible oils, salt, sugar, or other spice or condiments.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

Figure 1:
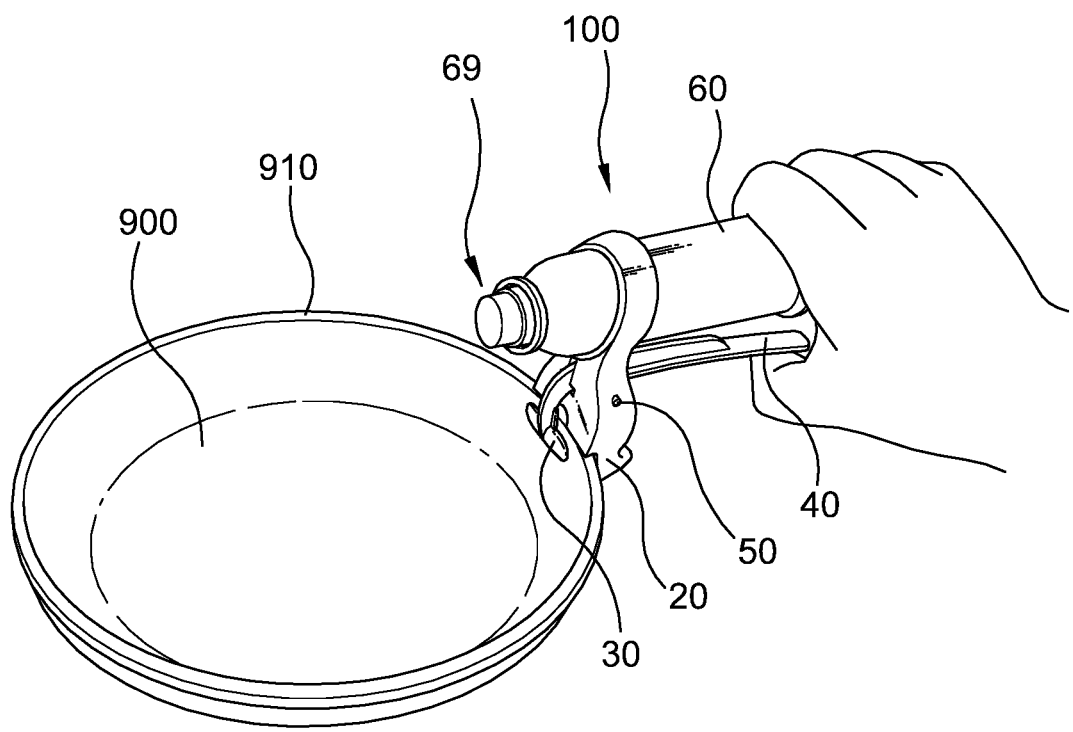
FIG. 1 is a perspective view showing a pan with a utility pan handle according to an embodiment.

Referring to the figures, the embodiments of the invention are described in detail.

As shown in FIGS. 1-10, an aspect of the invention provides a utility pan handle (100), comprising a base body (10), a lower jaw (20), an upper jaw (30), a handle (40), a pivot pin (50), and a bottle (60).

Figure 7:
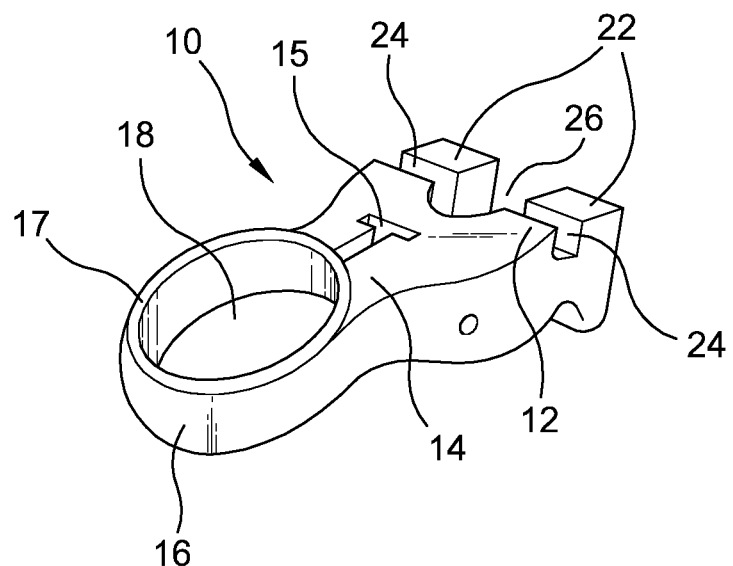
FIG. 7 is a perspective top view showing a base body with a lower jaw according to an embodiment.

The base body (10) has a first end portion (12), a middle portion (14), and a second end portion (16) as shown in FIG. 7.

Figure 2:
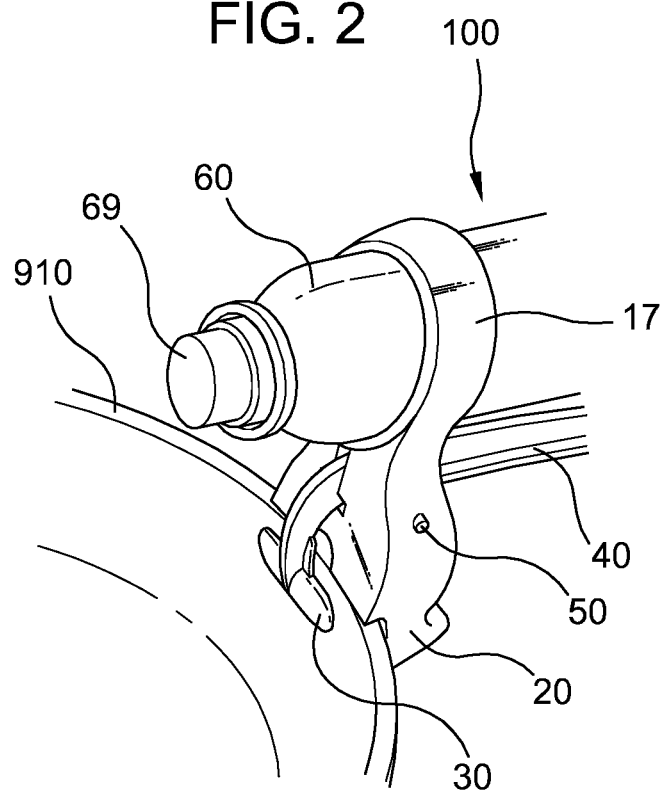
FIG. 2 is a perspective view partially showing a utility pan handle according to an embodiment.

The lower jaw (20) is provided in the first end portion (12) of the base body (10) and configured for being pressed on an outer brim edge portion (910) of an external container (900) from outside thereof as shown in FIGS. 1 and 2.

The upper jaw (30) is configured to clip on an inner brim edge portion of the external container (900) from inside thereof as shown in FIGS. 1 and 2.

Figure 4:
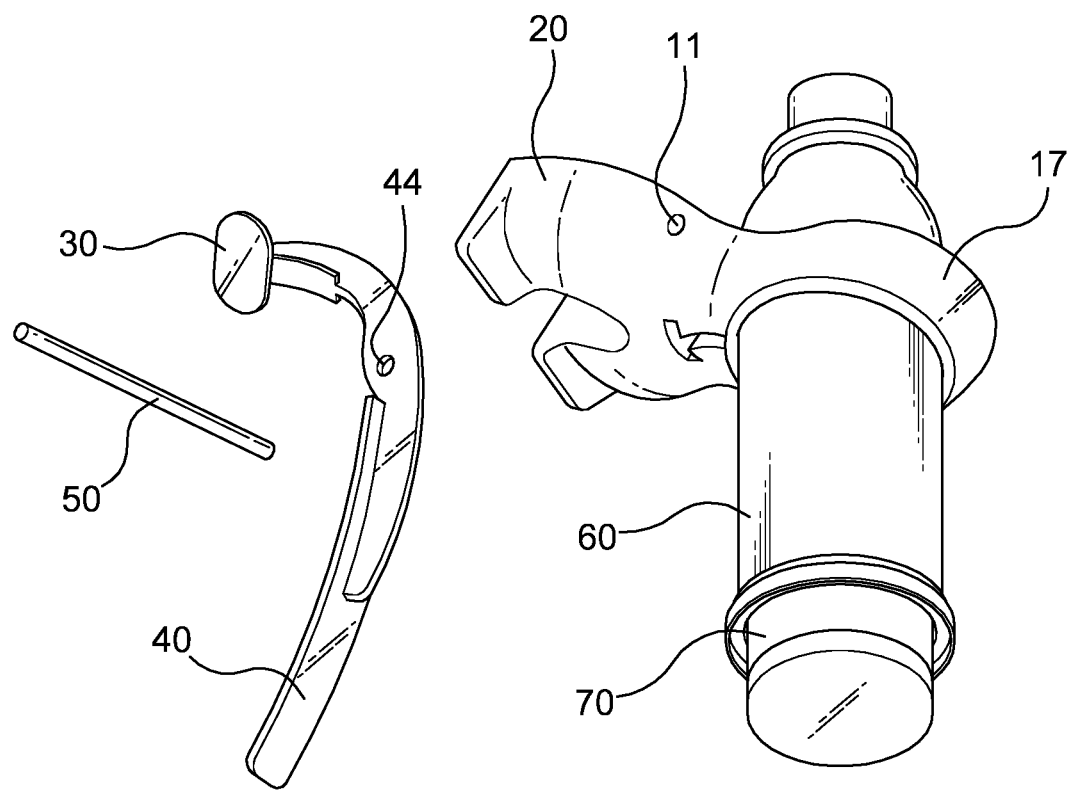
FIG. 4 is an exploded view showing a utility pan handle according to an embodiment.
Figure 9:
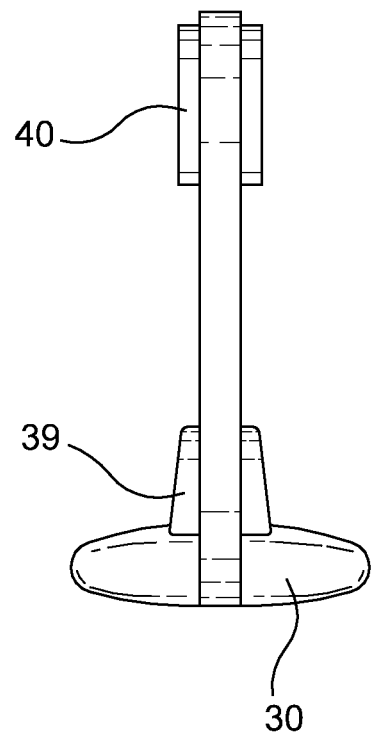
FIG. 9 is a perspective front view showing an upper jaw according to an embodiment.
Figure 10:
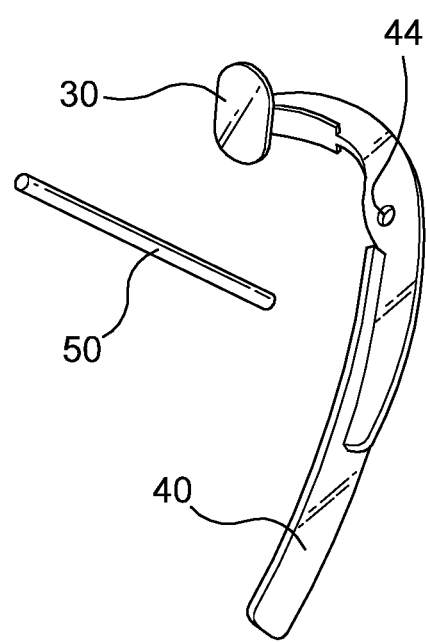
FIG. 10 is perspective bottom view showing an upper jaw according to an embodiment.

The handle (40) extends vertically from the upper jaw (30) and has an overall L-shape, and the handle (40) and the upper jaw (30) are formed integrally as shown in FIGS. 4 and 9-10. The integrated body of the upper jaw (30) and the handle (40) may further include a certain number and shape of strengthening structure (39) as shown in FIGS. 9-10.

The pivot pin (50) is installed rotatably through holes (11, 44) disposed though the middle portion (14) of the base body (10) and a connecting portion (34) of the handle (40) and the upper jaw (30).

Figure 3:
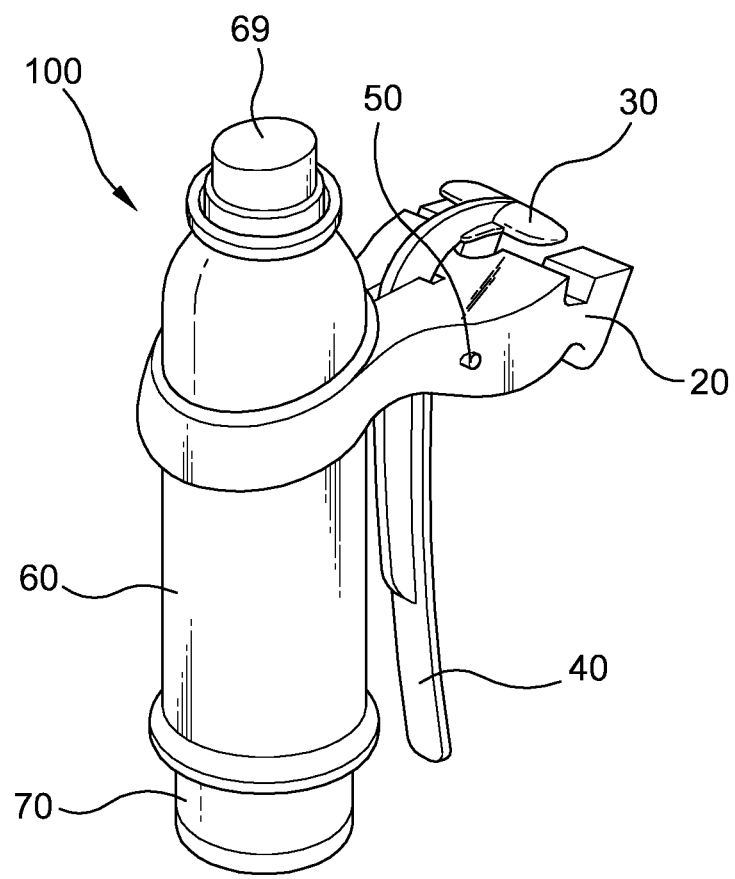
FIG. 3 is another perspective view partially showing a utility pan handle according to an embodiment.

The bottle (60) is configured to engage the second end portion (14) of the base body (10) vertically to the base body (10) and substantially in parallel to the handle (40) as shown in FIG. 3. Of course, the angles may change according to the position and exact shape of the handle (40) as shown in FIGS. 1-3 and 5.

The upper jaw (30) and the lower jaw (20) open and close about the pivot pin (50) by closing and opening the handle (40) with respect to the bottle (60), gripping the brim edge (910) of the external container (900).

Figure 8:
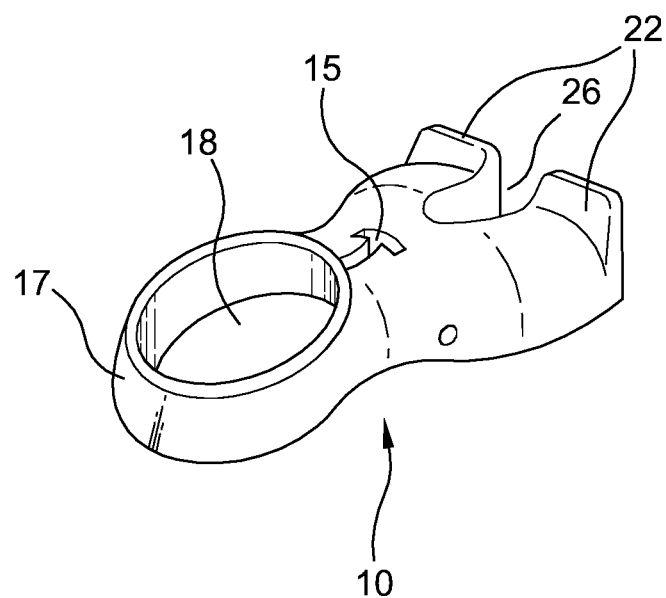
FIG. 8 is a perspective bottom view showing a base body with a lower jaw according to an embodiment.

The lower jaw (20) may comprise two prongs (22) and two receiving grooves (24) as shown in FIGS. 7-8. The two prongs (22) are formed with a gap (26) inbetween. Each of the two receiving grooves (24) may be formed on each of the two prongs (22), and each of the two receiving grooves (24) receives and facilitate to engage stably with the brim edge (910) of the external container (900).

The base body (10) may further comprise a vertical through-hole (15) provided through the middle portion (14) of the base body (10), and the handle is disposed through the vertical through-hole (15) of the base body (10), and the vertical through-hole (15) is configured to allow the handle (40) and the upper jaw (30) rotate about the pivot pin (50) by a specific angle so as to grip or release the brim edge (910) of the external container (900). The shape and size of the vertical through-hole (15) is configured to fit with the cross-sectional shape of the connecting portion (34) of the handle (40) and the upper jaw (30) as shown in FIGS. 3 and 5-8.

The upper jaw (30) may have a T-shape head and made of metal. The utility pan handle (100) may further comprise a pad portion (80) fixed to a lower surface of the upper jaw (30) and facilitating to grip the inner brim edge of the external container (900), and the pad portion is made of silicon as shown in FIG. 10.

Figure 6:
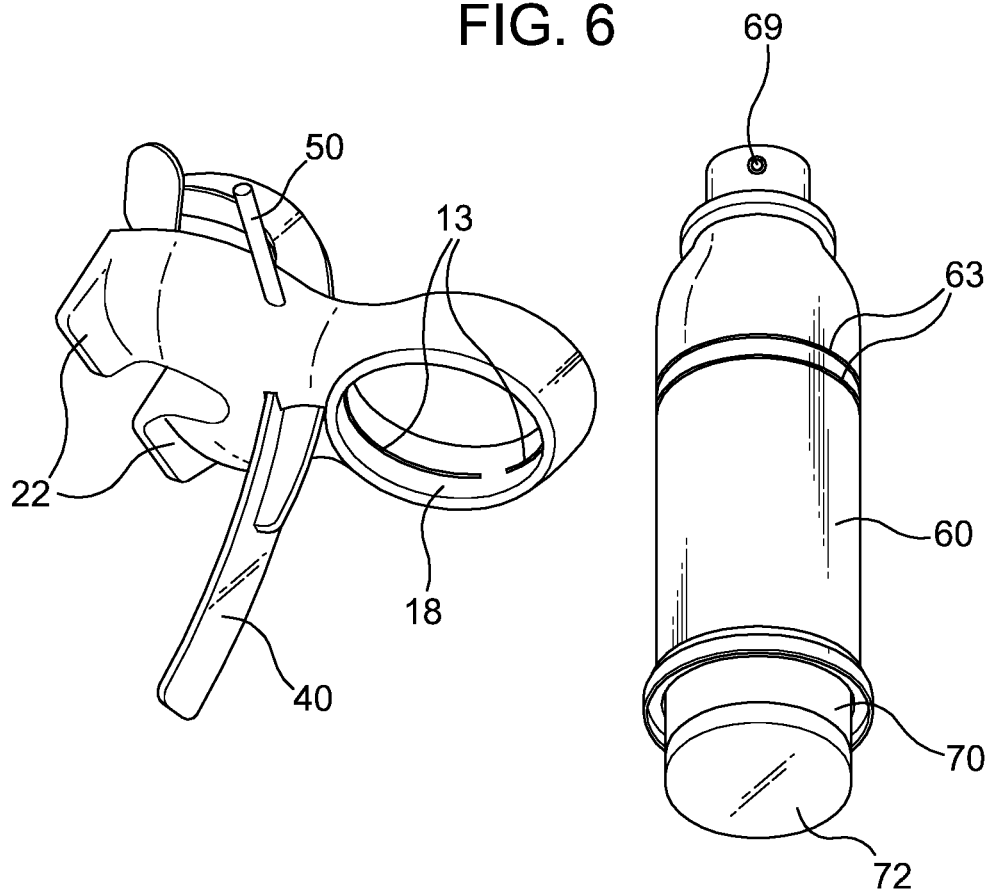
FIG. 6 is another perspective view showing a bottle with a plug-bottle disengaged from the rest of the utility pan handle according to an embodiment.

The base body (10) may further comprise a ring portion (17) with a through-opening (18) provided at the second end portion (16) of the base body (10), and the ring potion (17) is configured to receive and engage with and detachably fix in place the bottle (60) as shown in FIGS. 6-8.

The bottle (60) may have a shape of cylinder and is made of heat-resistant plastic, and the through-opening (18) of the ring portion (17) has a diameter substantially same as a diameter of the bottle (60) or a diameter larger than a diameter of the bottle (60), so that the bottle (60) budges with respect to the base body (10) and still engages the ring portion (18) in place.

The bottle (60) may further comprise a groove or bump (63) and the ring portion (17) comprises a corresponding bump or groove (13) that is configured to be locked with and detachably engage each other as shown in FIG. 6. The groove and bump may be provided in a full circle or a plurality of broken lines.

The bottle (60) may be configured to contain edible oil inside. The bottle (60) may be configured to be fixed to the second end portion (16) of the base body (10) vertically to the base body (10) and substantially in parallel to the handle (60).

The external container (900) may comprise a pan with the brim edge (910) with a latching portion protruding outwards perpendicularly to the side surface. Each of the two receiving grooves (24) may have a cross-sectional shape corresponding to the latching portion.

Figure 5:
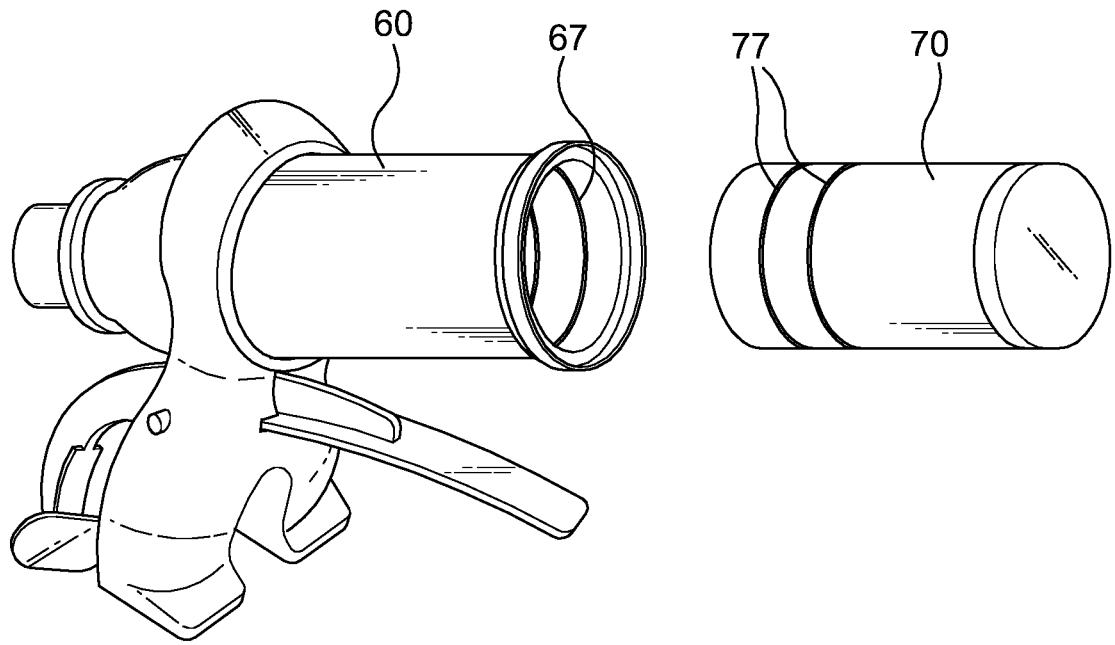
FIG. 5 is a perspective view showing a plug-bottle disengaged from rest of the utility pan handle according to an embodiment.

As shown in FIG. 5, the utility pan handle (100) may further comprise a plug-bottle (70) installed at a lower open end of and plugging the bottle (60) through male and female fastening devices (67, 77) including threads or O-rings and corresponding groove provided at the bottle (60) and the plug-bottle (70), which is configured to stop and seal the edible oil in the bottle (60). The plug-bottle (70) is configured to contain a condiment, and the condiment comprises salt, pepper, or spice. The plug-bottle (70) may include one or more holes at one end (72) as shown in FIG. 6. Of course, the bottle (60) may have a nozzle portion (69) as shown in FIGS. 1-3 and 6.

Another aspect of the invention provides a pan comprising and a container and other component of the above utility pan handle. The reference numerals are same as in the above embodiment.

The latching portion is provided along a brim edge of the container. The base body has a first end portion, a middle portion, and a second end portion. The lower jaw is provided in the first end portion of the base body and configured for being pressed on the latching portion from outside thereof. The upper jaw configured to clip on the latching portion from inside thereof. The handle extends vertically from the upper jaw and has an overall L-shape, wherein the handle and the upper jaw are formed integrally. The pivot pin is installed rotatably through holes disposed though the middle portion of the base body and a connecting portion of the handle and the upper jaw. The bottle is configured to engage the second end portion of the base body vertically to the base body ad substantially in parallel to the handle. The upper jaw and the lower jaw open and close about the pivot pin by closing and opening the handle with respect to the bottle and gripping the latching portion.

The lower jaw may comprise two prongs and two receiving grooves. The two prongs are formed with a gap inbetween, and each of the two receiving grooves is formed on each of the two prongs, and each of the two receiving grooves receives and facilitate to engage stably with the latching portion.

The base body may further comprise a vertical through-hole provided through the middle portion of the base body, and the handle is disposed through the vertical through-hole of the base body, and the vertical through-hole is configured to allow the handle and the upper jaw rotate about the pivot pin by a specific angle and grip or release the latching portion.

The upper jaw may have a T-shape head and be made of metal.

The base body may further comprise a ring porting with a through-opening provided at the second end portion of the base body, and the ring potion is configured to receive and engage detachably with the bottle.

The bottle may have a shape of cylinder and the through-opening of the ring portion has a diameter substantially same as a diameter of the bottle.

The bottle may be configured to is fixed to the second end portion of the base body vertically to the base body and substantially in parallel to the handle.

The pan may further comprise a plug-bottle installed at a lower open end of and plugging the bottle through male and female fastening devices including threads or O-rings and corresponding groove provided at the bottle and the plug-bottle, wherein the plug-bottle is configured to contain a condiment, and wherein the condiment comprises salt, pepper, or spice.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A utility pan handle comprising:
   a base body having a first end portion, a middle portion, and a second end portion;
   a lower jaw provided in the first end portion of the base body, wherein the lower jaw is capable of being pressed on a brim edge portion of an external container;
   an upper jaw configured to clip on an inner brim edge portion of the external container from inside thereof;
   a handle extending vertically from the upper jaw, wherein the handle has an overall L-shape, and wherein the handle and the upper jaw are formed integrally;
   a pivot pin installed through the base body and a connecting portion of the handle; and
   a bottle configured to engage the second end portion of the base body and the bottle is configured to be located next to the handle,
   wherein the upper jaw and the lower jaw open and close about the pivot pin, wherein the upper jaw and the lower jaw are capable of gripping the brim edge portion of the external container when closed.

2. The utility pan handle of claim 1, wherein the lower jaw comprises:
   two prongs formed with a gap inbetween; and
   two receiving grooves, wherein each of the prongs has a respective groove formed thereon, so that each of the two receiving grooves is configured to receive and stably engage with the brim edge portion of the external container.

3. The utility pan handle of claim 1, wherein the base body further comprises a vertical through-hole provided through the base body, and the handle is disposed through the vertical through-hole of the base body, and wherein the vertical through-hole is configured to allow the handle and the upper jaw rotate about the pivot pin by a specific angle so as to grip or release the brim edge portion of the external container.

4. The utility pan handle of claim 1, wherein the upper jaw has a T-shape head and made of metal.

5. The utility pan handle of claim 4, further comprising a pad portion fixed to a lower surface of the upper jaw and facilitating to grip the inner brim edge portion of the external container, and wherein the pad portion is made of silicon.

6. The utility pan handle of claim 1, wherein the base body further comprises a ring portion with a through-opening provided at the second end portion of the base body, and wherein the ring portion is configured to receive and engage with and detachably fix in place the bottle.

7. The utility pan handle of claim 6, wherein the bottle has a shape of cylinder and is made of heat-resistant material, and the through-opening of the ring portion receives the bottle, so that the bottle is placed in the base body.

8. The utility pan handle of claim 6, wherein the bottle further comprises a groove or bump and the ring portion comprises a corresponding bump or groove that is configured to be locked with and detachably engage each other.

9. A pan comprising:
   a container;
   a latching portion provided along a brim edge of the container;
   a base body having a first end portion, a middle portion, and a second end portion;

a lower jaw provided in the first end portion of the base body, wherein the lower jaw is capable of being pressed on the latching portion;

an upper jaw configured to clip on the latching portion;

a handle extending vertically from the upper jaw, wherein the handle has an overall L-shape, and wherein the handle and the upper jaw are formed integrally;

a pivot pin installed on the base body and a connecting portion of the handle; and a bottle configured to engage the second end portion of the base body and the bottle is placed next to the handle, wherein the upper jaw and the lower jaw open and close about the pivot pin, wherein the upper jaw and the lower jaw are capable of gripping the latching portion.

10. The pan of claim 9, wherein the lower jaw comprises:

two prongs formed with a gap inbetween; and two receiving grooves, wherein each of the prongs has a respective groove formed thereon, so that each of the two receiving grooves is configured to receive and stably engage with the latching portion.

11. The pan of claim 9, wherein the base body further comprises a vertical through-hole provided through the middle portion of the base body, and the handle is disposed through the vertical through-hole of the base body, and wherein the vertical through-hole is configured to allow the handle and the upper jaw rotate about the pivot pin by a specific angle and grip or release the latching portion.

12. The pan of claim 9, wherein the upper jaw has a T-shape head.

13. The pan of claim 9, wherein the base body further comprises a ring portion with a through-opening provided at the second end portion of the base body, and wherein the ring portion is configured to receive and engage detachably with the bottle.

14. The pan of claim 13, wherein the bottle has a shape of cylinder and the through-opening of the ring portion receives the bottle.

15. The pan of claim 9, wherein the pan further comprises a plug-bottle removably installed at a lower open end of the bottle, wherein the plug-bottle engages the bottle through male and female fastening devices, and wherein the plug-bottle is configured to contain a condiment.

* * * * *